United States Patent
Ashley et al.

[11] 3,765,746
[45] Oct. 16, 1973

[54] INFRARED GERMANIUM FILM POLARIZER

[75] Inventors: Edmond J. Ashley; Donald L. Decker, both of Ridgecrest; Jean M. Bennett, China Lake, all of Calif.

[73] Assignee: The United States of America as represented by the Secretary of the Navy, Washington, D.C.

[22] Filed: July 26, 1971

[21] Appl. No.: 166,174

[52] U.S. Cl. ................... 350/152, 350/1, 350/157
[51] Int. Cl. .............................................. G02b 5/30
[58] Field of Search .................... 350/1, 147, 152, 350/157

[56] References Cited
UNITED STATES PATENTS

| | | | |
|---|---|---|---|
| 3,439,968 | 4/1969 | Hansen et al. | 350/152 |
| 3,551,017 | 12/1970 | Iwasaki et al. | 350/1 |
| 3,531,313 | 9/1970 | Dates | 350/1 |

FOREIGN PATENTS OR APPLICATIONS

| | | | |
|---|---|---|---|
| 1,126,392 | 9/1968 | Great Britain | 350/152 |
| 1,155,625 | 5/1958 | France | 350/152 |

OTHER PUBLICATIONS

Walton et al., "Melinex' Polarizer for the near Infra-Red" J. Sci. Instr. Vol. 41, No. 11 (Nov. 1964) pp. 687–688 350/152.

Jena publication, "Interference Reflection Filter UV–R–250" Jenaer Glaswerk, Mainz, West Germany. Rec'd P.O. 3-1968. 350/1

Harrick, "Crossed–Plate Polarizer" J. Opt. Soc. Am. Vol. 54, No. 10 (Oct. 1964) pp. 1281–1282 350/152.

Hertz, Abstract No. 10787, "Improvement of Selenium Foil Polarizers by Exploitation of Interference Effect" Science Abstr. Sect. A (Aug. 1960) pp. 1065.

*Primary Examiner*—David Schonberg
*Assistant Examiner*—Michael J. Tokar
*Attorney*—R. S. Sciascia et al.

[57] ABSTRACT

An infrared germanium film polarizer based on interference in thin germanium films of different thicknesses inclined to an optic axis at the Brewster angle. The germanium films are evaporated onto a low index of refraction transparent substrate, namely sodium chloride. Four plates of sodium chloride are in the form of an X to make the path of each ray symmetrical, so the transmitted beam will be undeviated. A well collimated beam of infrared radiation passing through the polarizer will experience interference effects because of the germanium films on the sodium chloride plates. The p polarized light transmitted is diminished only by the reflection losses at the Ge-NaCl interfaces. The s polarized light undergoes interference in the thin Ge films.

1 Claim, 4 Drawing Figures

PATENTED OCT 16 1973 3,765,746

INVENTORS.
EDMOND J. ASHLEY
DONALD L. DECKER
JEAN M. BENNET

BY: ROY MILLER
ATTORNEY.

INFRARED GERMANIUM FILM POLARIZER

BACKGROUND OF THE INVENTION

This invention pertains to polarizers for infrared radiation.

Devices of the prior art for polarizing infrared radiation are usually of the "pile-of-plates" type and have the disadvantage of relatively long lengths, making them unsatisfactory for many applications. In order to substantially reduce the length of such polarizers, the normal pile-of-plates arrangement has been modified to a v-shaped or x-shaped structure as shown in the U.S. Pat. to Hansen et al. No. 3,439,968.

However, these plates are sufficiently thick that the coherence properties of the light beam are lost, and no interference effects occur. Thus, the degree of polarization attainable is not as good as with the present invention. The present invention, which employs thin films of Ge evaporated onto a low refractive index transparent substrate, is a superior polarizer because it makes use of interference effects to eliminate the unwanted s polarized beam.

While there has long been a need for high extinction, high transmission polarizers in the infrared region beyond the transmission limit of sheet Polaroid and calcite polarizing prisms, none have been developed. Wire grid polarizers can have extinction ratios approaching $10^{-3}$ and good transmissions at wavelengths much longer than the grid spacing, but their performance deteriorates rapidly at shorter wavelengths. Polarizers employing single or multiple reflections from selenium or germanium mounted at the Brewster (or polarization) angle $i_B$ ($i_B$ = arc tan $n_{Ge}/n_{air}$, where n is the index of refraction) have been built. These polarizers have high extinction ratios. However, in order to keep the beam on axis, compensating reflections from other materials are required, and the polarizers must be very long in order to accommodate a beam of reasonable cross section. Also, most reflection polarizers have very small acceptance angles.

Pile-of-plates transmission polarizers are generally used in the near infrared, and those made from high index materials can have reasonably good extinction ratios.

Some types of transmission polarizers produce beam shifts, and polarizers made out of low index of refraction materials such as various types of plastic sheets require large numbers of sheets to produce a moderate degree of polarization. Large amounts of scattering occur in such polarizers with a resultant loss of transmission. If all the sheets in the polarizer are of the same thickness, interference effects can produce large fluctuations of the extinction ratio with wavelength. On the other hand, interference effects can be used to improve the performance of a polarizer such as described by J. H. Hertz on pages 277 – 280 of "Experimentelle Technik der Physik" 7 (1959).

Frustrated total reflection polarizers also make use of interference effects in thin films. They have, theoretically, an extremely high degree of polarization. However, the transmission of these frustrated total reflection polarizers is limited to a very narrow band of wavelengths, so a series of polarizers must be constructed to cover an extended wavelength region.

The present invention makes use of interference effects to produce a polarizer having a high degree of polarization and good transmission over an extended wavelength interval in the near infrared (2 – 13 microns). This is the region beyond the cutoff of the high extinction sheet Polaroids and polarizing prisms used in the visible region and the start of the high performance region of wire grid polarizers.

SUMMARY OF THE INVENTION

An object of the present invention is to provide a high extinction, high transmission polarizer which operates in the infrared beyond the transmission limit of sheet Polaroid and calcite polarizing prisms (near 3 microns).

The present invention comprises four plates of a low index of refraction transparent substrate, namely sodium chloride, arranged in an X configuration. each plate is coated on both sides with germanium films by evaporating the germanium onto the plates. A well collimated beam of infrared light intersects the plates at the Brewster angle. Interference effects caused by thin germanium films of different thicknesses eliminate the unwanted s polarized beam.

The prior art shows no polarizer employing thin films of germanium. However, prior art polarizers employ relatively thick plates of solid germanium. Because of the thickness of these plates of germanium, coherent interference effects are impossible, and the unwanted s polarized beam cannot be effectively eliminated.

The prior art also fails to show the use of polarizers employing germanium films of different thicknesses.

DETAILED DESCRIPTION OF THE INVENTION

Figure 1:
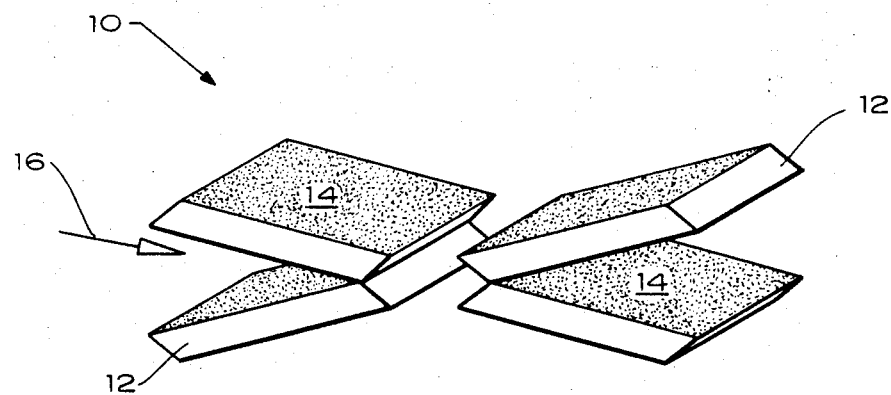
FIG. 1 shows the invention in perspective.

FIG. 1 shows the infrared polarizer 10 of the present invention comprising four separate sodium chloride plates 12 arranged in an X-configuration. Each plate is coated on both sides with a thin film of germanium 14. The top and bottom halves of polarizer 10 are symmetrical, i.e., the first germanium film that the light beam 16 encounters on both top and bottom plates is the same thickness, and the other pairs of films are likewise of equal thickness. As light beam 16 passes through the polarizer each of the four germanium films through which it passes are of different thicknesses.

The beam of light passing through the polarizer must be well collimated and must intersect each of the films at the Brewster angle $i_B$.

Figure 2:
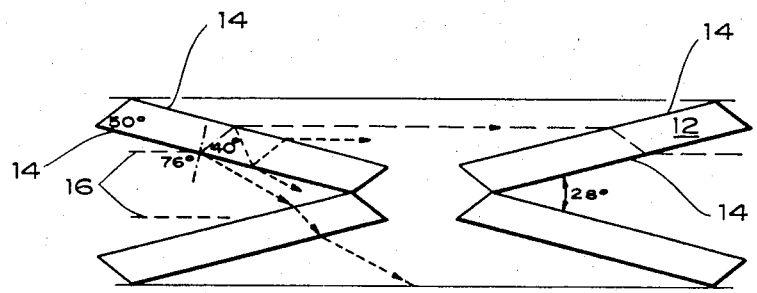
FIG. 2 is a side view of the invention.

FIG. 2 shows schematically light beam 16, represented by a long dashed line, traversing the polarizer. The beam encounters four germanium films of different thicknesses. Reflected beams are seen to not pass through the polarizer for the most part.

The polarizer is built in the form of an X to make the path of each ray symmetrical, so that the path of the transmitted beam will be undeviated.

Figure 3:
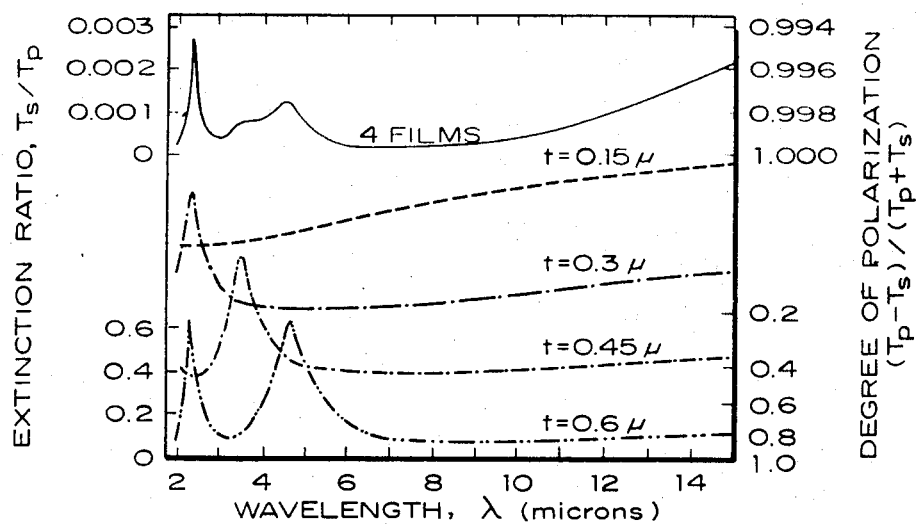
FIG. 3 shows calculated extinction ratios as a function of wavelength for each of four germanium films of different thicknesses.

FIG. 3 shows calculated extinction ratios as a function of wavelength for each of four germanium films of different thicknesses and, also, the total extinction ratio for four films. The extinction ratio is defined as the ratio of the fractions of incident s polarized light and p polarized light that is transmitted i.e., not reflected. The definition of $p$ polarized light and $s$ polarized light is light whose vibrations are parallel and perpendicular, respectively, to the plane of incidence.

The lowest scales go with the lowest-curve where it is seen that the extinction ratio varies between 0.083 and 0.649. The upper three-curves correspond to thinner germanium films, having the same magnitude of oscillation but with their ordinates displaced upward to show more clearly the positions of the interference maxima and minima. When an infrared light beam passes through each of these four germanium films in turn, the extinction ratio of the resultant beam will be the product of the four separate extinction ratios, as shown in the solid curve at the top of the graph.

Note that the extinction ratio for the four films varies between a maximum of 0.0029 and a minimum of 0.00022. If the wavelength of the light beam is restricted to the region between 2.5 microns and 12.5 microns, the extinction ratio remains below 0.0012, meaning that the degree of polarization is at least 0.998 in this region.

Figure 4:
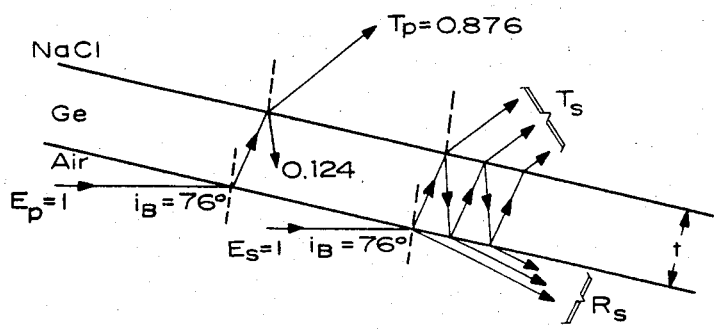
FIG. 4 shows a schematic diagram of the paths of the s and p rays through a germanium film.

FIG. 4 shows a schematic diagram of the paths of the $s$ and $p$ rays through the germanium film. The reflectance of the $p$ component is zero at the air-germanium interface, since the ray is incident at the Brewster angle, so the transmission is unity. At the germanium-sodium chloride interface, 0.124 of the $p$ component is reflected and 0.876 is transmitted. The entire reflected $p$ component passes through the germanium-air interface since the reflectance at this boundary is zero from both directions. Thus, the transmission of the $p$ component is 0.124 through each germanium film and is independent of the thickness of the film and the direction in which the ray is traveling. The transmittance of the $s$ component depends on the thickness of the germanium film and varies from a minimum of 0.073 to a maximum of 0.569. This latter value is the transmission through an air-sodium chloride boundary with no germanium film present.

What is claimed is:

1. A polerizer for infrared radiation comprising:

four plates of uniform thickness;

said plates being arranged in an X configuration;

a film of germanium on each of the two flat surfaces of each said plate;

each film surface having an incident radiation surface positioned at the Brewster angle with respect to an optic axis passing through each said plate;

each said plate consisting of a transparent substrate;

each said germanium film through which an optic axis passes being of a different thickness with respect to each other said germanium film through which said axis passes;

whereby the $p$ waves of an incident beam of infrared radiation are transmitted nearly undiminished at all infrared wavelengths for which bulk germanium is transparent, and the $s$ waves destructively interfere over a broad range of wavelengths to produce a minimum for s-wave transmission.

* * * * *